United States Patent
Schlieffers et al.

[11] Patent Number: 6,123,265
[45] Date of Patent: *Sep. 26, 2000

[54] DATA ACQUISITION DEVICE HAVING A RESILIENT SEAL INTERPOSED BETWEEN THE HEAD PORTION AND THE HANDLE PORTION FOR REST STAND

[75] Inventors: Joerg Schlieffers, Setauket; Gregory G. Jones, Sound Beach, both of N.Y.

[73] Assignee: Symbol Technologies, Inc., Holtsville, N.Y.

[ * ] Notice: This patent is subject to a terminal disclaimer.

[21] Appl. No.: 09/436,169

[22] Filed: Nov. 9, 1999

Related U.S. Application Data

[63] Continuation of application No. 08/883,357, Jun. 26, 1997, Pat. No. 5,979,770.

[51] Int. Cl.[7] .................................................. G06K 7/10
[52] U.S. Cl. ............... 235/472.01; 235/454; 235/462.43; 250/235; 361/728
[58] Field of Search .............................. 235/472.01, 454, 235/462.43; 250/235; 361/728

[56] References Cited

U.S. PATENT DOCUMENTS

| | | | |
|---|---|---|---|
| D. 387,753 | 12/1997 | Stewart et al. ........................ | D14/116 |
| D. 387,754 | 12/1997 | Stewart et al. ........................ | D14/116 |
| 4,165,554 | 8/1979 | Faget ....................................... | 235/1 D |
| 4,825,057 | 4/1989 | Swartz et al. ........................... | 235/472 |
| 5,092,793 | 3/1992 | Stephen .................................. | 23/472 X |
| 5,335,170 | 8/1994 | Petteruti et al. ..................... | 235/472 X |
| 5,349,497 | 9/1994 | Hanson et al. ....................... | 235/472 X |
| 5,378,882 | 1/1995 | Gong et al. ............................ | 235/472 |
| 5,410,141 | 4/1995 | Koenck et al. ......................... | 235/472 |
| 5,589,679 | 12/1996 | Dvorkis et al. ........................ | 235/472 |
| 5,594,232 | 1/1997 | Giordano ................................ | 235/472 |
| 5,600,121 | 2/1997 | Kahn et al. ............................. | 235/472 |
| 5,828,052 | 10/1998 | Reynolds et al. ..................... | 235/472 |
| 5,979,770 | 11/1999 | Schieffers ........................... | 235/472.01 |

*Primary Examiner*—Michael G. Lee

[57] ABSTRACT

A hand-held optical scanning device includes a body portion with an optical scanner module at a first forward end and having a keypad and display mounted on an upper surface. The handle portion extends from the body portion near the forward end and is oriented at a selected angle to cause a second rearward end of the bottom surface of the body portion to rest on the radial surface of a user's hand when a user grips the handle. The hand-held optical scanning device is further provided with a resilient seal interposed between the body portion and upper handle portion which functions to provide a ready made stand for the device.

9 Claims, 4 Drawing Sheets

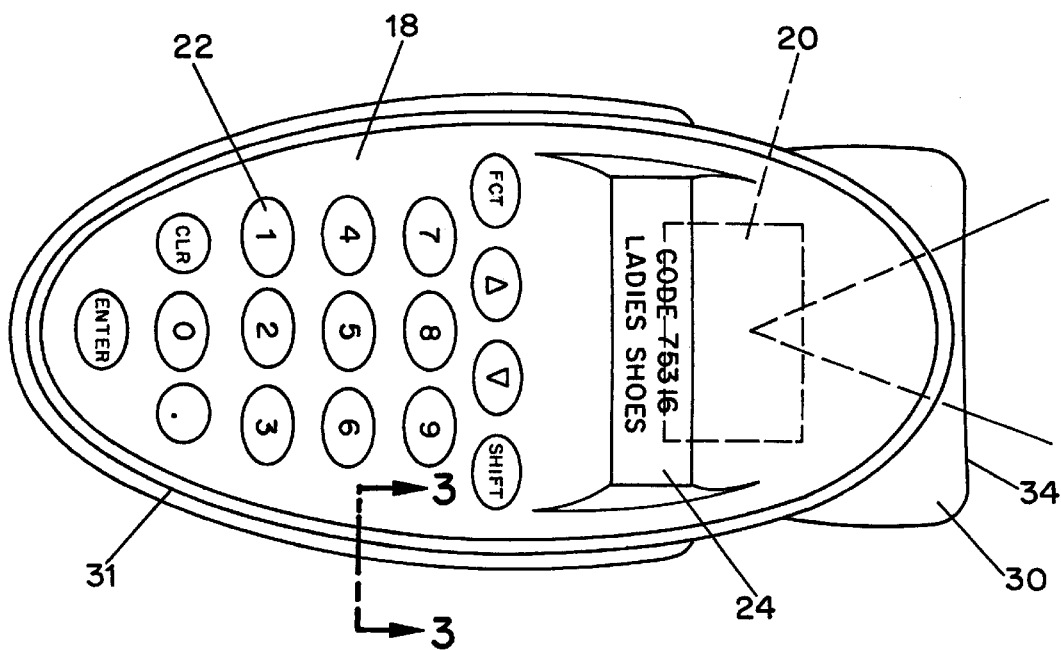
FIG. 2
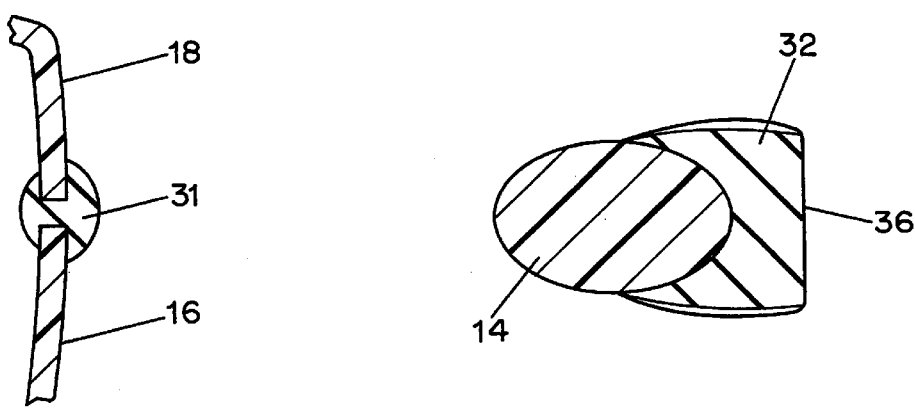
FIG. 3
FIG. 4

DATA ACQUISITION DEVICE HAVING A RESILIENT SEAL INTERPOSED BETWEEN THE HEAD PORTION AND THE HANDLE PORTION FOR REST STAND

REFERENCE TO RELATED APPLICATIONS

This application is a continuation of U.S. Continued Prosecution Application filed Jun. 14, 1999, currently allowed, which was a CPA of U.S. patent application Ser. No. 08/883,357, filed Jun. 26, 1997, now U.S. Pat. No. 5,979,770 entitled "Data Acquisition Device Having a Resilient Seal Interposed between the Head Portion and the Handle Portion for Rest Stand (as amended)".

BACKGROUND OF INVENTION

The present invention relates to hand held devices for acquiring data, and particularly to optical code reading devices, for example, for reading bar codes on items in stores, warehouses and businesses. U.S. Pat. No. 5,589,679 describes a hand held optical scanning device which is formed generally in the shape of a pistol having an upper surface provided with a data entry keypad and a display for displaying the identification of items scanned by the device to a user. Similar hand held scanners are disclosed in U.S. Pat. Nos. 5,594,232 and 5,600,121, all of which are assigned to the assignee of this application.

In connection with hand held data acquisition devices, wherein the devices are provided with a keypad for manual data entry, the prior art pistol configuration can be slightly awkward to use as keypad operation tends to push the scanner body downward.

It is an object of the present invention to provide a hand-held data acquisition device which has an improved ergonomic arrangement, whereby operation of a keypad thereon is firmly supported against the main portion of a user's hand to thereby provide a more stable support.

It is a further object of the invention to provide a data acquisition device with a convenient and protective resting arrangement.

SUMMARY OF THE INVENTION

In accordance with the present invention there is provided an optical scanning device having a body portion with a first distal end and having an optical scanning module oriented to scan objects in a direction which is outward from the distal end. A keypad and display are provided on the upper surface of the body portion. A handle is provided extending from a bottom surface of the body portion and joined to the body portion at a location near the distal end and at a selected angle which causes a proximal end of the bottom surface of the body portion to rest on a radial surface of a users hand when the user grasps the handle.

Preferably the scanning device and handle are contoured to comfortably conform to a users hand, such as, for example, by provision of a bulbous handle. The handle may include one or more trigger mechanisms. In a preferred arrangement the body portion includes a housing and a cover member jointed to the housing. A resilient seal is interposed between the housing and the cover and projects outwardly from the body portion to form a resilient ridge. In a preferred arrangement the ridge has a portion that forms a rest stand.

For a better understanding of the present invention, together with other and further objects, reference is made to the following description, taken in conjunction with the accompanying drawings, and its scope will be pointed out in the appended claims.

PREFERRED DESCRIPTION OF THE DRAWINGS

FIG. 2 is a top view of the FIG. 1 device.

FIG. 3 is an partial cross-sectional view of the FIG. 1 device.

FIG. 4 is another optical cross-sectional view of the FIG. 1 device.

DESCRIPTION OF THE PREFERRED EMBODIMENT

Figure 1:
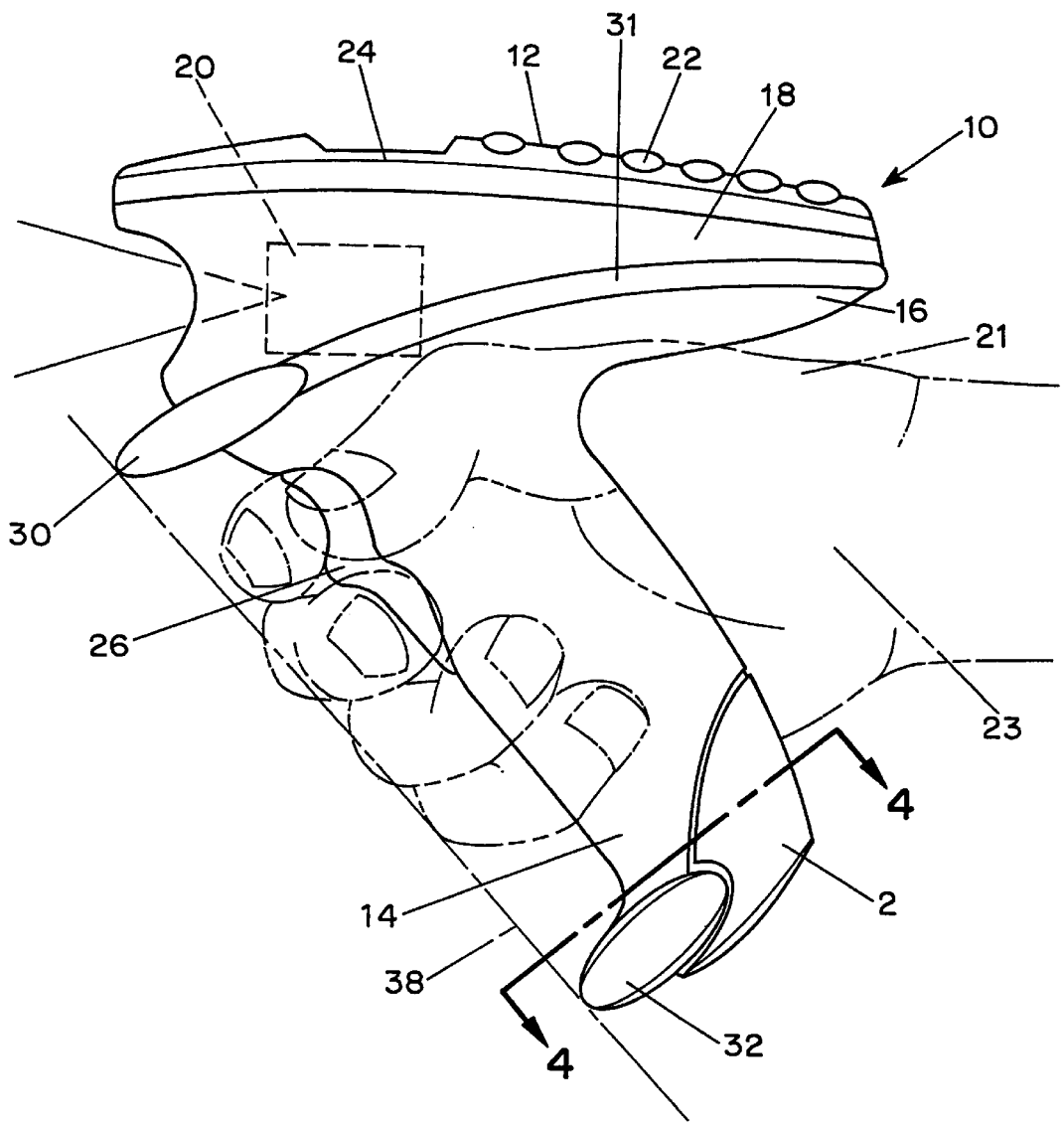
FIG. 1 is an elevation view of a preferred embodiment of an optical scanning device in accordance with the present invention.

Referring to FIGS. 1 and 2, an optical scanning device 10 is provided with a body portion 12 and a handle portion 14. An optical scanning module 20 is provided at a first distal end of body portion 12 for scanning objects in a direction that is outward from the distal end. It should be recognized that the optical scanning module may have a different location as long as it has an optical path outward from the distal end. Handle 14 extends from the bottom of body portion 12 near the distal end in a downward angular direction with respect to the body portion, as will be further described. Handle portion 14 may be joined to body portion 12 by conventional means or may be integrally molded with the bottom of body portion 12.

Scanning device 10 includes conventional components used in such devices, including the optical scanning module, a microcomputer for acquiring data and a power supply. Where the device is wireless, there may be provided a radio for sending data, such as inventory data, to a master station or to a nearby cash register, such as a checkout station or to another scanning device. The radio may be a local area wireless network such as the Spectrum 24 system made by the assignee of this application. Alternately, a cord providing power and data communications may be provided.

Figure 5A:
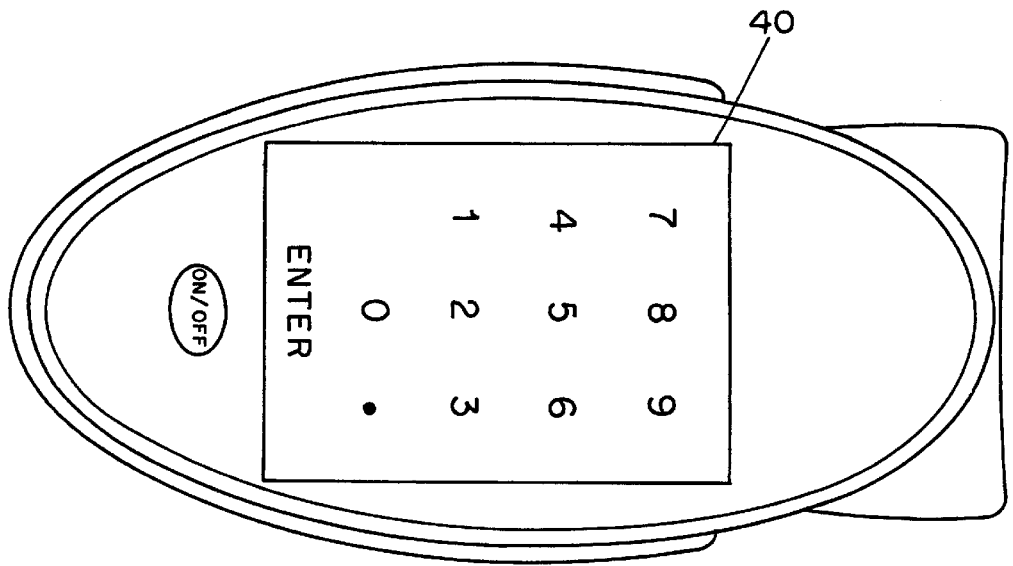
FIG. 5a is a top view of an alternate embodiment of the present invention.
Figure 5B:
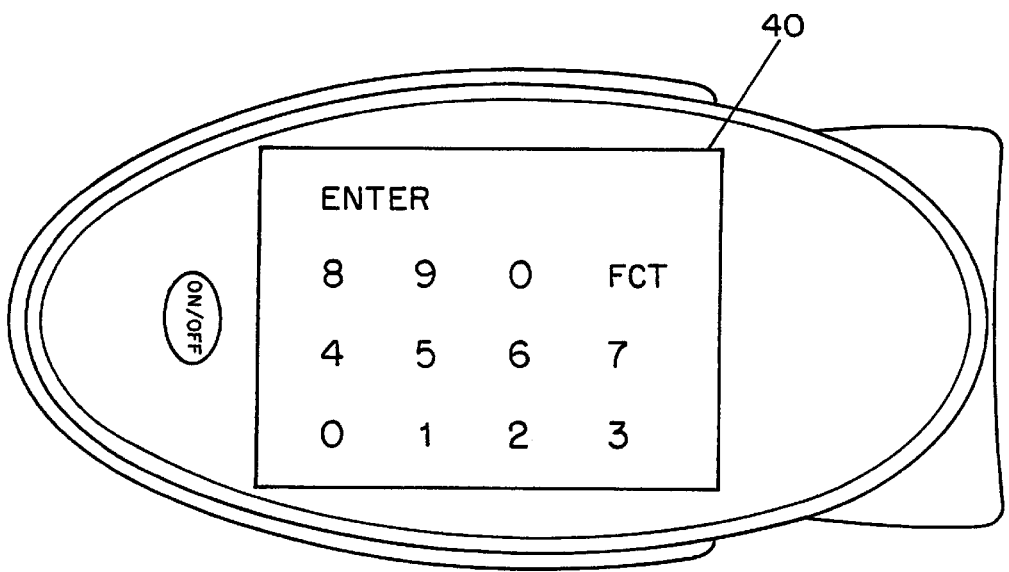
FIG. 5b is a top view of an alternate embodiment of the present invention illustrating the displayed information in horizontal configuration.

Body portion 12 includes a lower housing member 16 which is joined to an upper housing member 18 forming a cover. Resilient sealing member 30 is interposed between the lower housing member 16 and cover 18 to form a dust and moisture resistance seal therebetween, and to provide other functions as will be described. The upper surface of cover 18 includes a digital display 24 and a keypad 22 which can be seen in the top view of FIG. 2. Keypad 22 is useful in entering numeric data and/or desired function codes in a manner well known in the art. Display 24 may display information about scanned labels to the operator, and may also be useful in connection with providing operational or other information to the operator. As compared with the conventional placement of the display, the present invention positions the display closer to the operator. Thus, there is an increase in the viewing angle formed by the intersection of the plain of the display surface and the operator's line of sight. The increase in the viewing angle improves the visibility of the displayed information. In an alternate embodiment, (FIGS. 5a and 5b) the display is a touch sensitive data entry display 40. The display is increased in size to include a layer area of the top surface, and the majority of the keys can be eliminated. In such an embodiment, the display is rectangular in shape and has a vertical and horizontal configuration. The display may be switched between such configuration to adapt to a user's preference. In addition, the horizontal configuration (FIG. 5b) can be further configured for left-hand and right-hand use so as to be adapted for a wider range of users.

Scanning module 20 is of a conventional type known in the art, for example, as described in the above referenced U.S. patents owned by the assignee of the present application. In a battery operated configuration, handle 14 may include a connector at the lower end thereof, to be received in a cradle in which the battery of scanner 10 can be recharged. When in a cradle, scanner 10 may be used for hands-free scanning. The cradle may also be equipped to provide read-out of acquired data through infrared communication ports or other form of communication ports.

Figure 6:
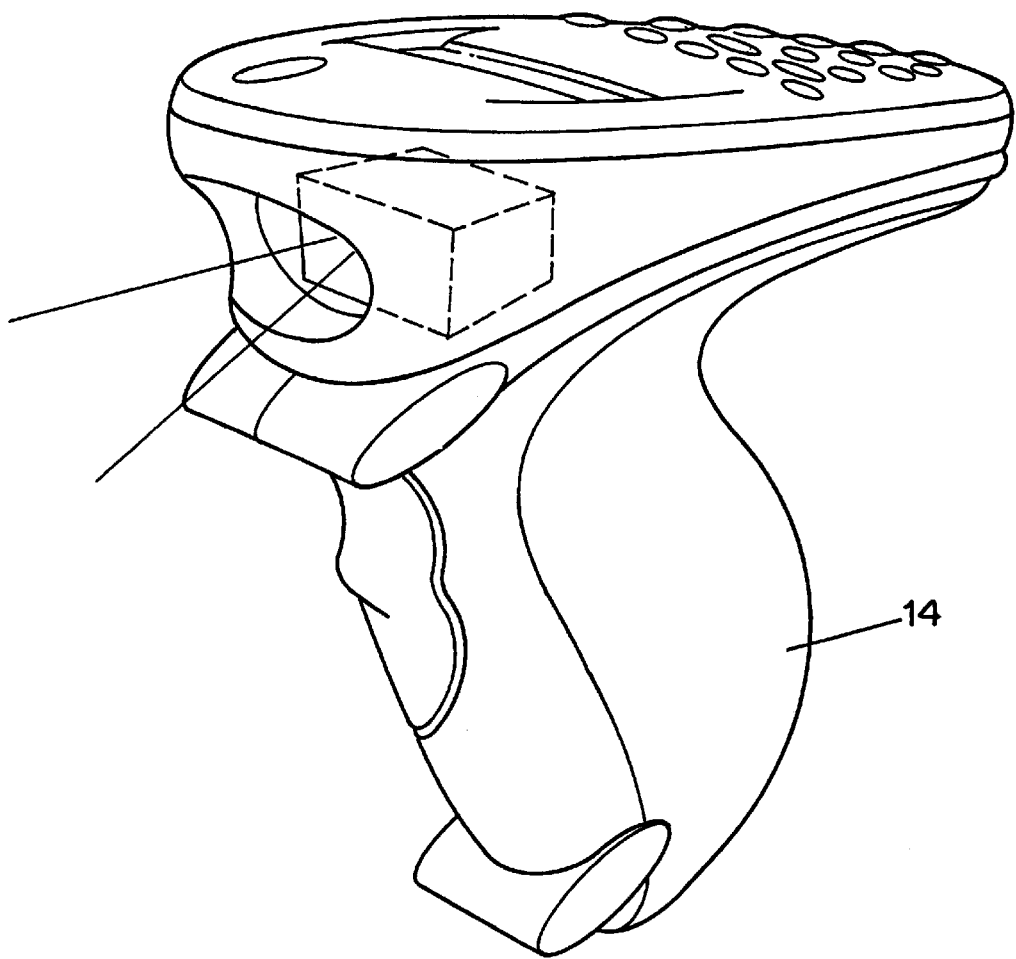
FIG. 6 is an alternate embodiment of a handle of the present invention.

One feature of the preferred embodiment shown in FIG. 1 is the arrangement of handle 14 near the distal end of body 12 having outwardly facing scanner module 20. When scanning device 10 is held in an operator's hand as shown in FIG. 1, the handle arrangement causes the proximal end of body portion 12 to extend over the radial surface 21 of the users hand 23, such that the lower surface of body portion 12 rests on and is supported by the radial hand surface 21. In this arrangement, the weight of body portion 12 is easily supported by the user during operation of the scanning device. FIG. 6 shows an alternate embodiment of the handle which is made to conform to a user's hand. When the user enters data by operating keypad 22 the body portion 12 is firmly supported by the radial hand surface 21 against the force of key strokes, avoiding a tendency to exert unsupported force on the handle grip of the user which would require a greater gripping force. Keypad 22 and display 24 are arranged for easy access to the user and easy viewing when the scanning device is held in the hand.

As is known for such scanning devices, handle 14 includes trigger button 26 which may be a two-finger trigger and provide multiple functions, such as read only or read and store, and/or scroll menu utility.

Another feature of the preferred embodiment of the invention is the provision of a rubber or other resilient gasket 31 between lower body member 16 and cover 18. As shown in the drawings, particularly FIGS. 2 and 3, resilient sealing member 31 extends a distance beyond the lower body 16 and cover 18 around almost the entire periphery of body portion 12. The extension of sealing member 30 provides two advantageous functions. First, the extended resilient member provides an additional bumping surface which can serve to protect the user's hand from injury, and also protect the scanner device from damage in the event it is accidentally bumped into or rubbed against shelves, walls or other objects during use. Secondly, the resilient extensions of member 30 as well as the remaining portions of the resilient gasket 31 in the side directions provides a non-slip resting member for the scanning device, when it is laid down on its side to temporarily free the user's hands for other tasks. The resilient nature of the sealing member 30 gives resistance to sliding off a resting surface that is not completely horizontal.

An additional feature of the preferred embodiment shown in FIGS. 1 and 2 is that the forward edge 34 of resilient member 30 forms a resting stand, for example by being configured either as a linear edge as shown in FIG. 2, or as a multi-point stand. This enables the scanner device 10 to be conveniently rested against a flat horizontal surface in a stable position. The place of a resting surface is shown by the dotted line 38 of FIG. 1. The resting configuration may be further improved by providing a ridge 32 on the lower end of handle 14, which may also include a linear surface 36, shown in FIG. 4 for providing a stable rest configuration. Ridge 32 may also be part of a resilient gasket between portions of the handle. Ridge 32 may be extended sideways, as shown in FIG. 4, to provide greater stability as a stand and a resting ridge for handle 14 in the event the scanning device is laid on its side resting on sealing member 30.

While there have been described what are believed to be the preferred embodiments of the present invention, those skilled in the art will recognize that other and further changes may be made thereto without departing from the spirit of the invention, and it is intended to claim all such changes and modifications as fall within the scope of the invention.

We claim:

1. A hand held data acquisition device, said device comprising:

an upper body portion having a bar code reading module contained therein and an aperture directed generally to a front direction of said hand held data acquisition device relative to said bar code reading module in said upper body;

a handle having a top end connected to said upper body portion, a bottom end, and further including a trigger for activating the bar code reading module;

a first resilient member coupled to the front of the upper body of said hand held device, said first resilient member having at surface contact region defining at least two points of contact with an external flat planar surface; and a second resilient member extending from a location in the general proximity of the bottom end of the handle, whereby the first resilient member and the second resilient member define a stand for the hand held device which accommodate placement and capture of the device by the hand of a user when placed in a generally planar surface.

2. The hand held data acquisition device of claim 1, wherein said upper body portion includes a display.

3. The hand held data acquisition device of claim 1, wherein said upper body portion includes an input means.

4. The hand held data acquisition device of claim 1, wherein said handle includes a finger trigger.

5. The hand held data acquisition device of claim 4, wherein the finger trigger is a dual finger trigger.

6. The hand held data acquisition device of claim 1, wherein said handle includes a battery pack.

7. The hand held data acquisition device of claim 1, further including a radio for wireless communication.

8. The hand held data acquisition device of claim 1, wherein said handle extends at an angle from a forward part of said upper body portion toward a rear part of said upper body portion.

9. The hand held data acquisition device of claim 1, wherein a bottom surface of said top portion is configured to rest on top of a user's hand when said handle is gripped with by the hand of a user.

* * * * *